United States Patent [19]
Mehdizadeh

[11] 3,911,734
[45] Oct. 14, 1975

[54] DETECTING INCIPIENT FATIGUE DAMAGE IN METAL

[75] Inventor: Parviz Mehdizadeh, Ponca City, Okla.

[73] Assignee: Continental Oil Company, Ponca City, Okla.

[22] Filed: Jan. 4, 1974

[21] Appl. No.: 430,862

[52] U.S. Cl. .................................. 73/91; 73/67.3
[51] Int. Cl.² .......................................... G01N 3/32
[58] Field of Search .............. 73/91, 69, 88 R, 67.3, 73/95

[56] References Cited
UNITED STATES PATENTS

| | | | |
|---|---|---|---|
| 2,299,722 | 8/1942 | Burns et al. .......................... 73/100 |
| 3,713,127 | 1/1973 | Keledy et al. ..................... 73/67.3 X |
| 3,774,443 | 11/1973 | Green et al. ..................... 73/88 R X |

OTHER PUBLICATIONS

Hagemaier, D. J. et al., Nondestructive Testing ... Structures, Sept. 1970 from Materials Evaluation Vol. 28 No. 9 pp. 194, 195.

*Primary Examiner*—Jerry W. Myracle
*Attorney, Agent, or Firm*—Robert B. Coleman, Jr.

[57] ABSTRACT

A method of detecting incipient fatigue damage in a metal specimen by periodic proof tests wherein the metal specimen is removed from service, subjected to a load and the acoustic emission characteristics determined during application of the load.

1 Claim, 2 Drawing Figures 3,911,734

DETECTING INCIPIENT FATIGUE DAMAGE IN METAL

BACKGROUND OF THE INVENTION

1. Field of the Invention

This invention involves a process for detecting incipient fatigue damage in metal structures. More particularly, it involves such a method wherein such damage can be detected without destroying the test specimen.

2. Description of the Prior Art

Many costly structural failures could be avoided if a part of the structure could be continuously monitored for early signs of incipient failure. This objective has been sought for many years through developments in various methods of nondestructive testing such as ultrasonic testing, radiography, magnetic particle inspection and the like. The development and refinement of these nondestructive test methods have resulted in increased accuracy with which flaws in a structure can be detected. However, these test methods are unable to assess the significance of a flaw relative to the service requirements. It is possible for a metal structure to undergo fatigue damage without developing a detectable fatigue crack. Such a condition is referred to as incipient fatigue damage.

It is an object of this invention to provide a method of detecting incipient fatigue damage in a metal specimen. It is a further object to provide such a method which can be used periodically and repeatedly throughout the service life of the metal specimen. It is another object to provide such a method which does not adversely affect the fatigue life of the metal specimen. It is still another object to provide such a method which is easy to run and simple to evaluate. Other objects, advantages, and features of the invention will become apparent from a consideration of the following description, drawings, and appended claims.

BRIEF SUMMARY OF THE INVENTION

A method of detecting incipient fatigue damage in a metal specimen comprising applying a load to the metal specimen while determining the acoustic emission characteristics of the specimen during the time period that the load is applied and removed.

DESCRIPTION OF THE PREFERRED EMBODIMENT

When solid materials undergo plastic deformation and fracture, energy is released. Part of this energy is converted into transient vibrations which are referred to as acoustic emissions.

Many materials when deformed emit transient vibrations in the audible and subaudible range. These vibrations, referred to as acoustic emissions, can be monitored and used to elucidate information on the deformation behavior of materials and give warning of their impending failure.

Plastic deformation of metals produces three types of energy release: electron emission referred to as the Kramer effect; thermal emission, which is manifested as a temperature gradient around a flaw; and stress waves referred to as acoustic emissions.

Many metal parts undergo plastic deformation, fracture, and eventual failure during their service life. Of particular interest in this invention are metal conduits used in wells such as drill pipe and sucker rods used in producing oil once a well has been completed. Such metal parts are known to be subject to severe stresses during their service life. It is highly desirable to monitor such metal parts so they may be used as long as possible but be replaced before they fail in service.

The two types of acoustic pulses produced during the deformation of a metal vary in amplitude and rate of emission. Continuous type emission is the term used to describe acoustic pulses of low amplitude that are emitted at a rapid rate. The continuous emission is attributed to small-scale dislocation movements. Burst type emissions are high amplitude pulses which occur at random intervals during the deformation of materials. The burst type emission has been attributed to localized deformation processes, such as mechanical twinning, surface slip, microcracking, and microvoid formation.

The type of emission produced by deforming a material with complex structure such as steel includes both the continuous type emission resulting from the general formation of the ferrite matrix as well as localized burst type emission due to the rupture or microvoid formation at the carbide-ferrite boundaries.

Since burst type emission has a much higher amplitude than the continuous type, it is more easily detected. Furthermore, the burst type emission is associated with localized defects in a material and thus is more significant as a means of evaluating the integrity of the material.

The load is conveniently applied by gripping the metal specimen near each end thereof and applying a tension stress to the metal specimen by pulling on it.

The acoustic emission characteristics of a metal part can be monitored by either counting the total number of acoustic emissions or the rate (number of counts per unit weight of load) of the emission as a function of the load.

Figure 1:
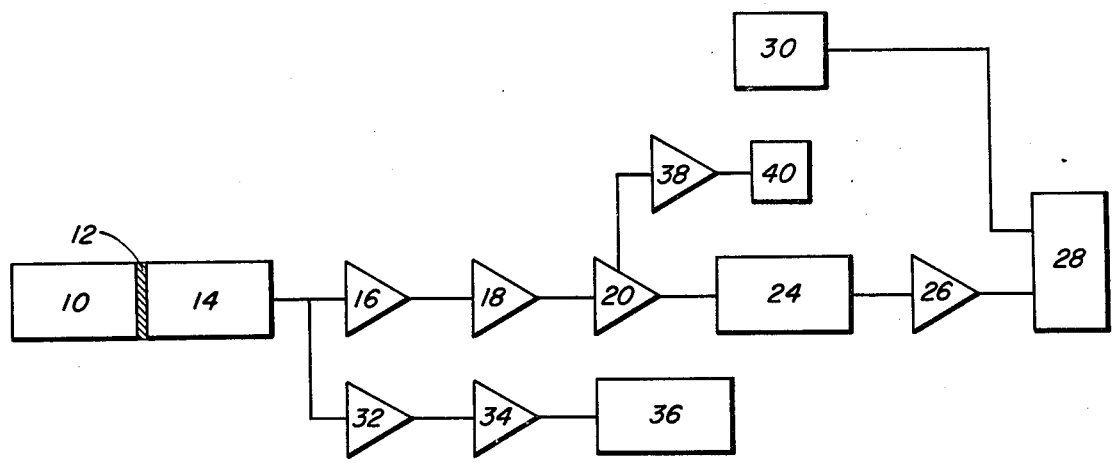
FIG. 1 is a schematic block diagram of the apparatus used to determine the acoustic emission characteristics of a metal specimen.
Figure 2:
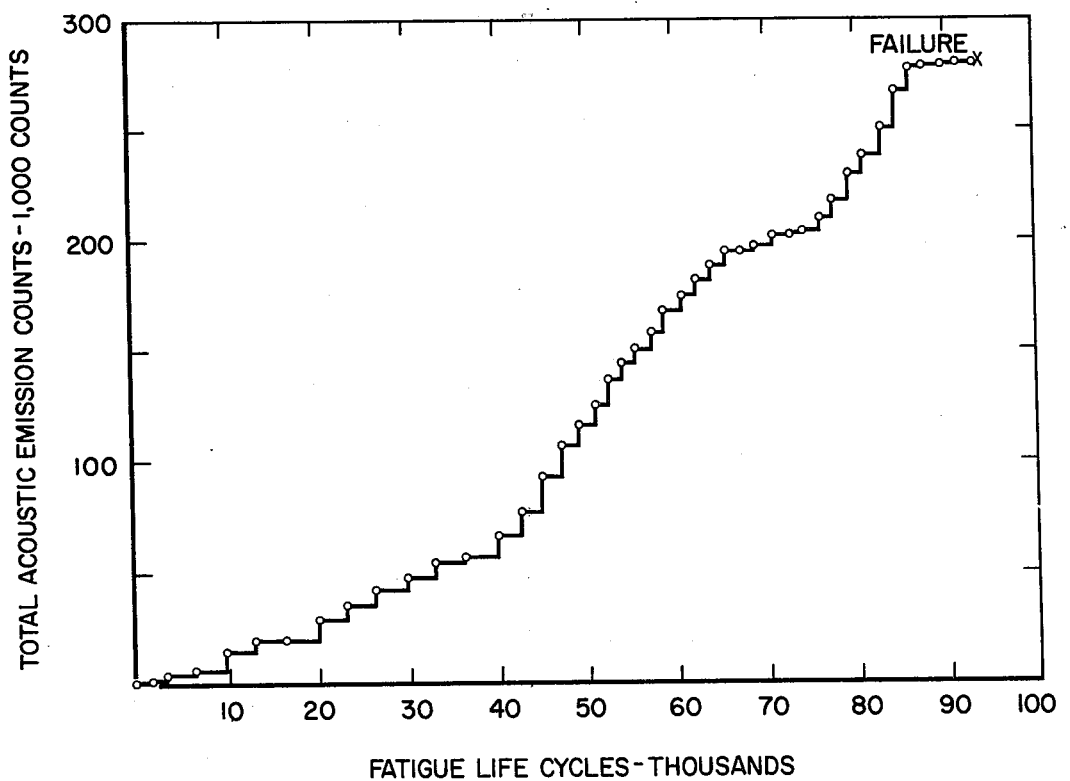
FIG. 2 is a graphical representation of the results of a determination of the acoustic emission characteristics of a metal specimen.

Referring to FIG. 1, the process of the invention is carried out by coupling an acoustic energy sensor such as electrodynamic transducer or piezoelectric accelerometer 14 to metal specimen 10 with coupling fluid 12 such as an epoxy resin or light oil. As a tension load (not shown) is applied to metal specimen 10 the low level electrical signals generated by the transducer are passed through filter band pass 16, preamplifier 18 and amplifier 20. The extraneous noises due to sources other than the acoustic emission, such as tools or equipment and the like, have frequencies less than 25 kilohertz. Therefore, the frequency selected for detection is normally quite high; e.g., 50 kilohertz to 3 M hertz. The narrow filter band pass 16 increases the signal-to-noise ratio. The resulting signal may be either audio or visually displayed. For audio display, the signal may be passed through audio amplifier 38 and speaker 40. For visual display, the signal may be passed through counter 24 which has a linear response over the required frequency range and log converter 26 to X–Y plotter 28. The strain, pressure or load 30 applied to metal specimen 10 is also supplied to X–Y plotter 28. The results of a typical plot from X–Y plotter 28 is shown in FIG. 2. Alternatively, the signal from transducer 14 can be passed through power amplifier 32 and spectrum analyzer 34 and visually observed on oscilloscope 36.

FIG. 2 shows a typical plot wherein a carbon-manganese steel specimen was subjected to a maximum stress of 30,000 pounds per square inch in a series of periodic proof tests while counting the total acoustic emission counts using a piezoelectric transducer as shown in FIG. 1. It was found that the total number of counts increased in a substantially straight line manner until about 40,000 fatigue life cycles had been experienced. Between 40,000 and 60,000 fatigue life cycles, the number of acoustic emission counts increased at a more rapid rate. This interval is the region of incipient fatigue damage. After a brief leveling off, the number of acoustic emission counts increased rapidly again from 70,000 to 80,000 fatigue life cycles at which point the metal specimen failed by breaking. Thus, by following the graph it can be shown that the material may be safely used up to at least 70,000 fatigue life cycles before requiring replacement.

A proof load during testing of from about 1 to about 2 times the service load the metal part will experience has been found to be satisfactory.

An additional advantage of the periodic acoustic emission proof testing is that such testing itself increases the fatigue life of the drill pipe or sucker rod subjected to the periodic tests to three to four times the fatigue life without periodic proof testing.

Acoustic emission from a material is irreversible with respect to load. Thus, if a part or structure containing a flaw is proof tested to a certain stress level and then unloaded, no emission will occur during a subsequent loading until the reloading exceeds the previous load. However, if in the interval between the two proof tests the flaw has grown; e.g., by failure, corrosion fatigue or stress corrosion, then the higher stress concentration (intensity) resulting from the larger defect size would cause additional plastic deformation at the tip of the flaw even though the stress is unchanged. Thus, additional plastic deformation generates acoustic activities whose intensities are proportional to the magnitude of crack (flaw) growth. Thus, periodic proof testing with simultaneous acoustic emission monitoring can be used to assess structural degradation due to the growth of a significant flaw.

It is to be understood that the foregoing description is merely illustrative of the ways in which the process of this invention may be carried out. Various other modifications and variations within the scope of the invention will occur to those skilled in the art.

We claim:

1. A method of detecting incipient fatigue damage in a metal specimen subjected to repeated fatigue life cycles during the service of said metal specimen comprising:
    a. removing the metal specimen from service;
    b. applying a tension load to the specimen at least equal to the load the specimen receives in service;
    c. determining the total number of acoustic emissions produced during said loading;
    d. removing the tension load from the specimen and returning the specimen to service;
    e. repeating steps (a) through (d) until a plot of acoustic emissions versus fatigue life cycles indicates incipient fatigue damage in the specimen; and
    f. permanently removing the specimen from service prior to the development of a detectable fatigue crack therein.

* * * * *